United States Patent
Choi et al.

(10) Patent No.: US 12,511,221 B2
(45) Date of Patent: Dec. 30, 2025

(54) ANALYSIS DEVICE AND METHOD FOR DETECTING VARIABLE VULNERABILITY IN SOFTWARE USING MACHINE LEARNING MODEL

(71) Applicant: EWHA UNIVERSITY-INDUSTRY COLLABORATION FOUNDATION, Seoul (KR)

(72) Inventors: Byoung Ju Choi, Seoul (KR); Ji Hyun Park, Goyang-si (KR)

(73) Assignee: EWHA UNIVERSITY-INDUSTRY COLLABORATION FOUNDATION, Seoul (KR)

( * ) Notice: Subject to any disclaimer, the term of this patent is extended or adjusted under 35 U.S.C. 154(b) by 222 days.

(21) Appl. No.: 18/368,833

(22) Filed: Sep. 15, 2023

(65) Prior Publication Data
US 2024/0202099 A1   Jun. 20, 2024

(30) Foreign Application Priority Data

Dec. 15, 2022 (KR) .................. 10-2022-0176168
Jan. 18, 2023 (KR) .................. 10-2023-0007409

(51) Int. Cl.
G06F 9/44        (2018.01)
G06F 11/3604     (2025.01)
G06F 11/362      (2025.01)

(52) U.S. Cl.
CPC ...... *G06F 11/3612* (2013.01); *G06F 11/3624* (2013.01); *G06F 11/3636* (2013.01)

(58) Field of Classification Search
CPC ............. G06F 11/3612; G06F 11/3624; G06F 11/3636
See application file for complete search history.

(56) References Cited

U.S. PATENT DOCUMENTS

| | | | |
|---|---|---|---|
| 2018/0203790 A1* | 7/2018 | Carey | G06F 11/3636 |
| 2021/0174253 A1* | 6/2021 | Moore | G06N 7/01 |
| 2022/0083450 A1* | 3/2022 | Geddes | G06F 21/57 |

FOREIGN PATENT DOCUMENTS

| | | |
|---|---|---|
| KR | 10-2006-0030393 A | 4/2006 |
| KR | 10-1507469 B1 | 4/2015 |
| KR | 10-1963756 B1 | 3/2019 |
| KR | 10-2420514 B1 | 7/2022 |
| WO | WO 2018/101575 A1 | 6/2018 |

* cited by examiner

*Primary Examiner* — Hang Pan
(74) *Attorney, Agent, or Firm* — Paratus Law Group, PLLC

(57) ABSTRACT

Provided are a device and method for detecting a variable vulnerability in software using a machine learning (ML) model. The method performed by an analysis device includes receiving a source code of a program to be analyzed, replacing call functions, variable names, and call stack functions in an execution log generated during execution of the source code with certain identifiers (IDs) to preprocess the execution log, analyzing the preprocessed execution log through a pretrained first learning model to classify whether each pair of a global variable and a call function is at an initialization location, analyzing the preprocessed execution log through a pretrained second learning model to estimate a maximum value and a minimum value of the global variable, and determining whether the global variable is vulnerable on the basis of information output by the first learning model and information output by the second learning model.

10 Claims, 8 Drawing Sheets

ANALYSIS DEVICE AND METHOD FOR DETECTING VARIABLE VULNERABILITY IN SOFTWARE USING MACHINE LEARNING MODEL

CROSS-REFERENCE TO RELATED APPLICATIONS

This application claims priority under 35 U.S.C. § 119(a) to Korean Patent Application Nos. 10-2022-0176168 (filed on Dec. 15, 2022) and 10-2023-0007409 (filed on Jan. 18, 2023), which are all hereby incorporated by reference in their entirety.

ACKNOWLEDGEMENT

This work was supported by an Institute of Information & communications Technology Planning & Evaluation (IITP) grant funded by the Korean government (MSIT) (No. RS-2022-00155966, Artificial Intelligence Convergence Innovation Human Resources Development (Ewha Womans University), NTIS No. 1711179344).

BACKGROUND

The following description relates to a technique for detecting a variable vulnerability in software.

With the advent of the fourth industrial era, the importance of software is increasing in various industries. Defects in software may commonly occur in design or implementation processes during software development. Common Weakness Enumeration (CWE) is used for identifying vulnerabilities that software may have. Many software vulnerabilities are related to variables.

Incorrect use of a variable in software may cause a malfunction. When local variables are used without initialization, defects are detected during compilation. However, in the case of global variables, defects remain undetected even in the absence of initialization codes, as the compiler initializes their values. A problem occurs when the compiler initializes a variable to a wrong value despite a specific initial value, or when a variable that should or should not be initialized during program execution is not initialized or is initialized. According to CWE, a list of vulnerabilities of such variables continues to increase.

A software vulnerability detection tool according to the related art performs static analysis on a source code. Since runtime defects detected through static analysis are not based on actual execution, static analysis frequently causes many false alarms. To increase the accuracy of software defect detection, it is necessary to detect and dynamically verify defects on the basis of actual execution. However, dynamic verification incurs significant overhead due to information collection or execution tracking for defect detection. In particular, the detection of defects caused by variables requires monitoring of all locations where the variables are used, resulting in very significant overhead. Further, techniques according to the related art have a fundamental problem in that it is difficult to detect defects when software is not executed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of detecting a variable vulnerability in software using a machine learning (ML) model, the method including receiving, by an analysis device, a source code of a program to be analyzed, extracting, by the analysis device, an execution log during execution of the source code, replacing, by the analysis device, call functions, variable names, and call stack functions with certain identifiers (IDs) to preprocess the execution log, analyzing, by the analysis device, the preprocessed execution log through a pretrained first learning model to classify whether each pair of a global variable and a call function is at an initialization location, analyzing, by the analysis device, the preprocessed execution log through a pretrained second learning model to estimate a maximum value and a minimum value of the global variable, and determining, by the analysis device, whether the global variable is vulnerable on the basis of information output by the first learning model and information output by the second learning model.

In another aspect, there is provided a device for detecting a variable vulnerability in software, the device including an interface device configured to receive a source code of a program to be analyzed, a storage device configured to store a first learning model for classifying an initialization location of a global variable and a second learning model for estimating a maximum value and a minimum value of the global variable, and a arithmetic device configured to preprocess an execution log generated during execution of the source code by replacing call functions, variable names, and call stack functions in the execution log with certain IDs and determine whether the global variable is vulnerable on the basis of whether the global variable included in the execution log has been initialized or the initialization location of the global variable which is determined by inputting the preprocessed execution log to the first learning model, and information determined by inputting the preprocessed execution log to the second learning model.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
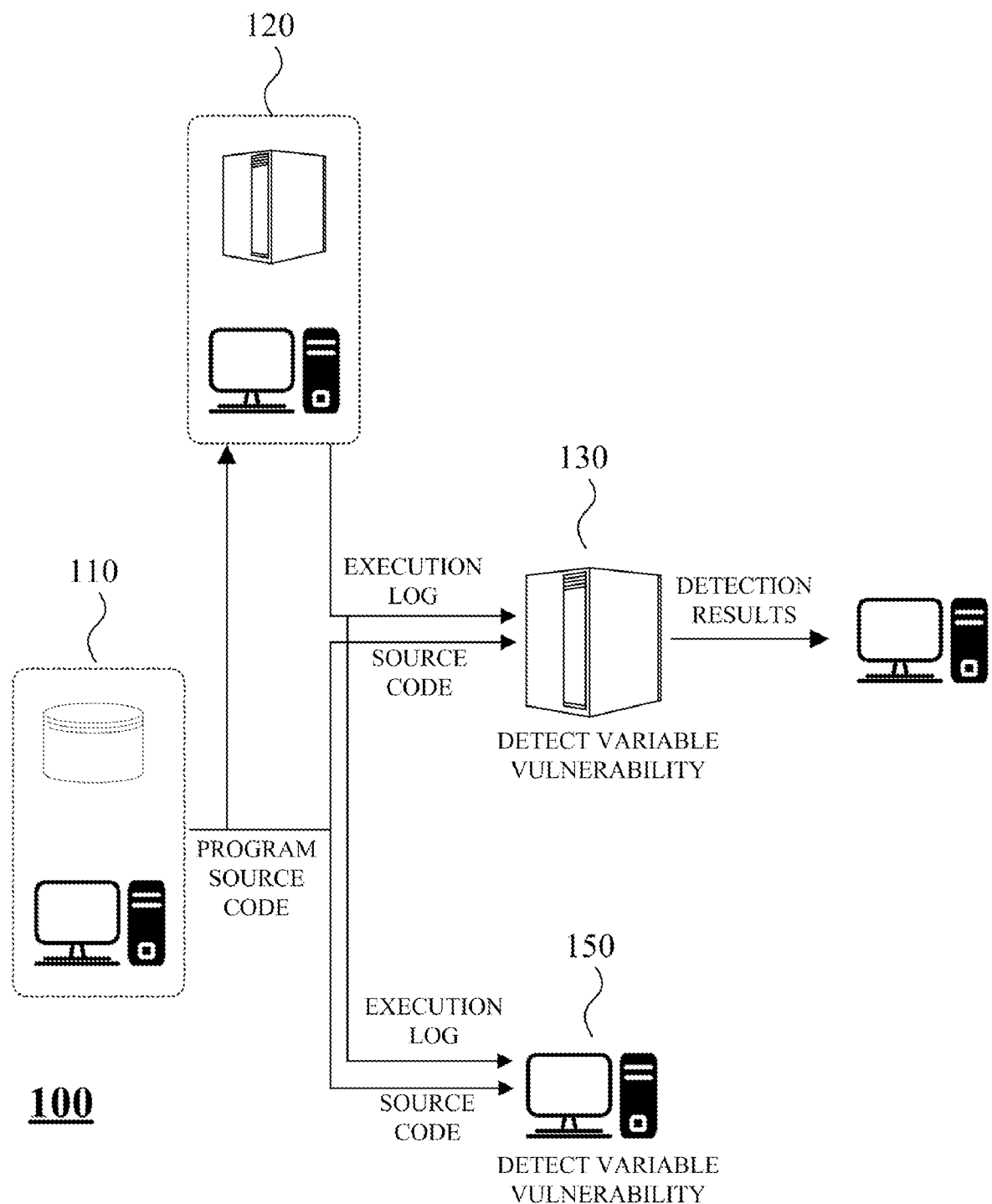
FIG. 1 is a diagram illustrating an example of a system for detecting a variable vulnerability in software.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The following description relates to a technique for detecting the probability of a defect or vulnerability according to a variable value in software.

A device for detecting a variable vulnerability of software is referred to as an "analysis device" below. The analysis device is a device that detects a defect by analyzing software code and may be implemented in various forms. For example, the analysis device may be a server, a personal computer (PC), a smart device, a chipset in which a program for detecting a vulnerability is embedded, or the like.

The analysis device detects a variable vulnerability using a machine learning (ML) algorithm. ML is a field of artificial intelligence (AI) in which algorithms that allow a computer to perform learning are developed. There are various types of ML models such as a decision tree model, a random forest model, a K-nearest neighbor (KNN) model, a Naïve Bayes model, a support vector machine (SVM) model, an artificial neural network (ANN) model, and the like.

An ML model for detecting a variable vulnerability of software is referred to as an "analysis model" below. The analysis model may be implemented on the basis of any one of various ML methodologies.

FIG. 1 is a diagram illustrating an example of a system 100 for detecting a variable vulnerability in software. In FIG. 1, analysis devices 130 and 150 detect variable vulnerabilities. In FIG. 1, analysis devices are shown in the form of a server 130 and a computer terminal 150.

A source code provision device 110 provides a source code of a specific program coded by a developer. The source code provision device 110 may be a developer terminal or a device that stores the source code, such as a database or a server.

An execution log provision device 120 receives the program source code and generates an execution log while executing the corresponding program. The execution log provision device 120 provides an environment in which the program is run and generates an execution log according to execution time.

The analysis devices 130 and 150 receive the source code of the program to be analyzed from the source code provision device 110. The analysis devices 130 and 150 receive the execution log of the program to be analyzed from the execution log provision device 120.

The analysis devices 130 and 150 detect variable vulnerabilities by analyzing the source code and the execution log. The analysis devices 130 and 150 extract certain variable information using an analysis model. The variable information includes a variable initialization location, a maximum value and a minimum value of a variable in an execution process, and the like. The analysis devices 130 and 150 derive variable vulnerabilities or the probability of a defect from the program to be analyzed on the basis of the extracted variable information. The analysis devices 130 and 150 may output the analyzed variable vulnerability or transmit it to another terminal.

A process in which a researcher builds an analysis model for detecting a variable vulnerability will be described below.

The researcher defines types of defects as shown in Table 1 below by classifying vulnerabilities caused by incorrect use of variables.

TABLE 1

| Defect ID | Description | Related CWE-IDs |
| --- | --- | --- |
| F01 UINIT_VAR | Use of uninitialized variable | CWE-457 |
| F02 INVALID_INIT | Initialization during use of variable | CWE-481 |
| F03 OUT_OF_BOUND | Variable value is out of permissible range | CWE-125, 128, 130, 131, 197, 805, 839, 843 |

F01 UINIT_VAR denotes a defect caused by the use of uninitialized variables. Local variables are usually detected by a compiler, whereas global variables are initialized by the compiler. Therefore, the UINIT_VAR defect corresponds to a case where a local or global variable is not initialized with a correct value. Also, the UINIT_VAR defect includes the defect of a case where a global variable is used before initialization due to incorrect order of function calling even when an initialization code of the global variable exists. F02 INVALID_INIT refers to a defect in which the value of a variable is changed to an initial value while the variable is used by a function other than an initialization function thereof (non-initialization function). F03 OUT_OF_BOUND refers to a defect in which the value of a variable is outside of a permissible range. The permissible range includes not only a range dependent on the data type of a variable but also a permissible range of the variable extracted during source code analysis.

A process of constructing an analysis model will be described. An analysis model is trained by a training device.

The training device is a computing device for performing data processing and a training process of an ML model.

The researcher prepares training data for training an analysis model. The training data may be prepared for the same specific program. In other words, the analysis model may be provided specially for the specific program. The training data may include a source code and an execution log for the program.

Targets of which vulnerabilities will be detected include both local variables and global variables used in the program. To detect the defects defined in Table 1, it is necessary to define (i) a maximum value and minimum value of each variable, (ii) an initial value of each variable, and (iii) an initialization function for changing the value of each variable to its initial value.

Figure 2:
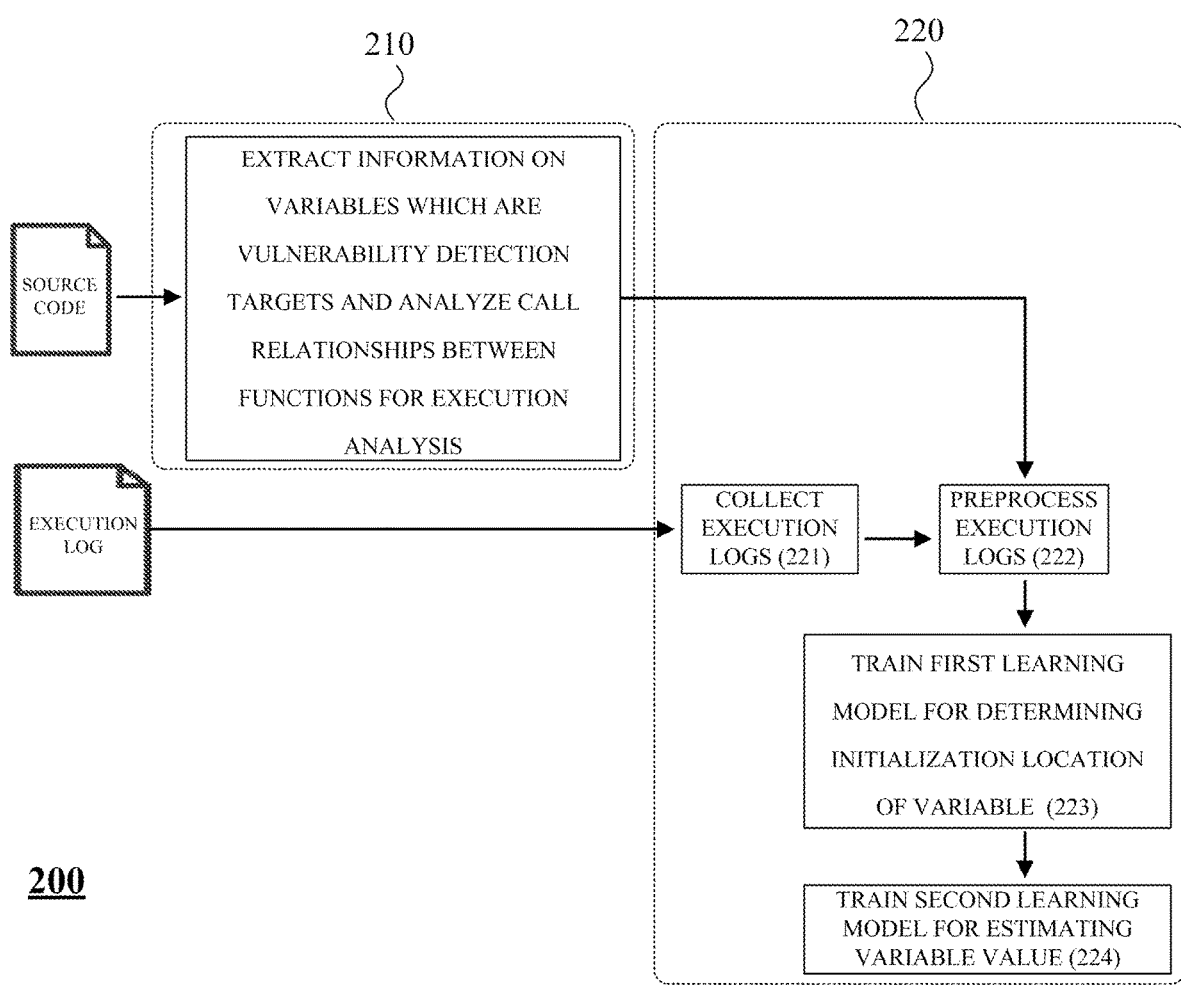
FIG. 2 is a diagram illustrating a learning process of an analysis model.

FIG. 2 is a diagram illustrating a learning process 200 of an analysis model.

The training device performs static analysis on a program for training (210). The training device extracts information on variables by statically analyzing a source code of the program.

The training device extracts a variable list and each variable's initial value, maximum value, and minimum value as variable information by statically analyzing the source of the program for training. Also, for execution analysis, the training device extracts a list of functions that use the variables and call relationships between the functions. Maximum values and minimum values of variables and a list of initialization functions which are not defined by static analysis are defined during training with execution logs.

Subsequently, the training device performs dynamic verification using execution logs which are collected during execution of the program (220). The dynamic verification is a process of constructing an analysis model for detecting variable vulnerabilities on the basis of execution logs. The analysis model includes a model for determining a location of an initialization function which is a vulnerability detection target and a model for inferring variable values used in a function.

After the static analysis, the training device collects execution logs while executing the program (221). The training device accesses a variable to be monitored during execution of the program and extracts and collects a call function location, a variable name, variable values before and after access, and a call stack in an execution log.

The execution log is raw data that is difficult to directly use for training, and thus requires certain preprocessing. The training device preprocesses (generalizes) the collected execution logs into data that is usable for training (222). In the preprocessing process, the training device replaces call functions, variable names, and call stack functions in an initial execution log with function IDs and variable IDs.

Criteria for determining vulnerabilities related to the initialization of variables are related to whether the variables are initialized, changes in variable values, and call functions. The researcher uses an ML model (first learning model) to determine whether a function using variables (call function) is a function that initializes variable values (initialization function). The first learning model classifies whether a {global variable-call function} pair is an initialization function.

The training device performs training of the first learning model for inferring whether a function is an initialization function for determining vulnerabilities related to initialization of variables using the preprocessed execution logs (223). The first learning model receives the preprocessed execution logs and classifies whether {global variable-call function} pairs are initialization functions. In this way, the first learning model infers initialization locations of variables.

The researcher uses a decision tree technique as the first learning model. The decision tree technique includes various algorithms such as ID3, C4.5, CART, and ensemble algorithms.

The researcher evaluated performance of the first learning model using the NASA Nearest Object dataset. The researcher constructed various types of decision trees to evaluate performance.

Figure 3:
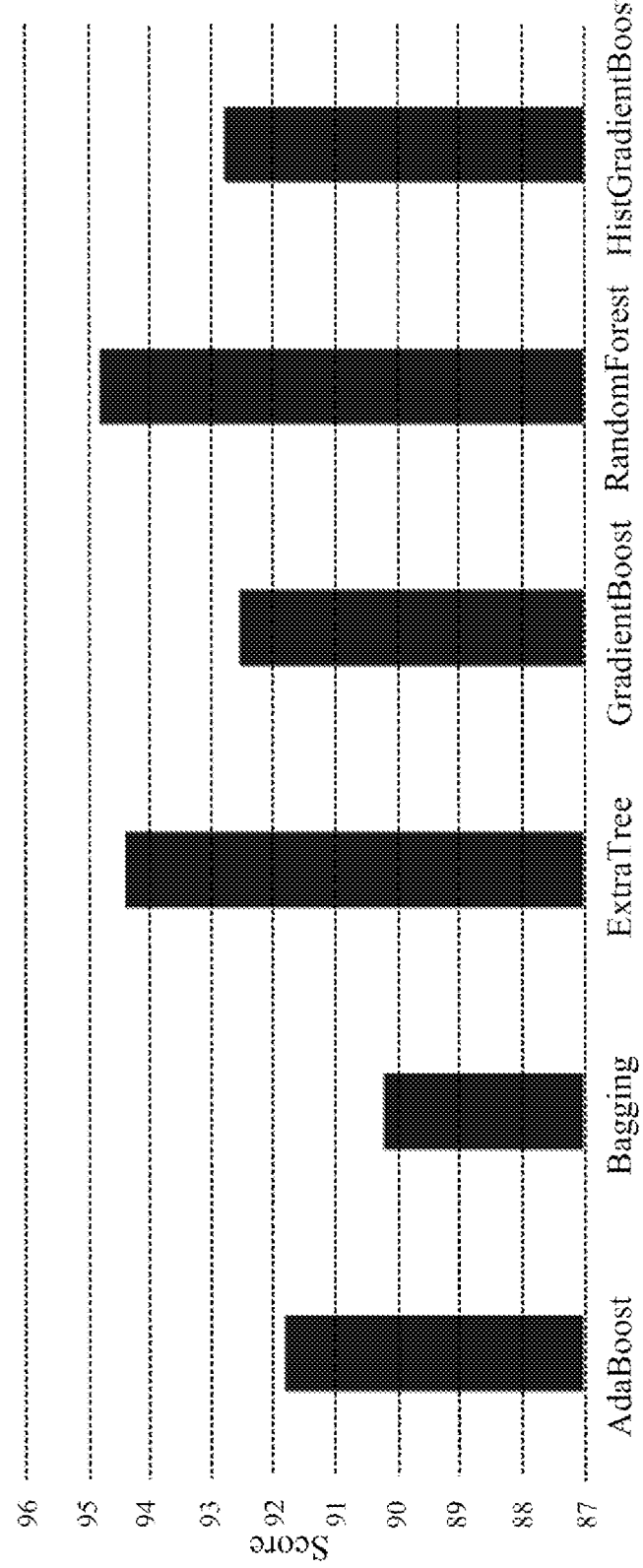
FIG. 3 is a graph illustrating performance evaluation results of a first learning model for inferring an initialization location of a variable.

FIG. 3 is a graph illustrating performance evaluation results of a first learning model for inferring an initialization location of a variable. As shown in FIG. 3, a RandomForest (RF) technique among models constructed by the researcher shows highest performance. Accordingly, the researcher used RF as the first learning model. However, as the first learning model, types of learning models other than the decision tree model may be used.

Also, the researcher constructed a separate ML model (second learning model) for determining whether a variable value is within a permissible range to determine whether the variable value is appropriate. The second learning model infers a maximum value and a minimum value for a specific variable.

Training data is information on changes in variable values in execution logs. The training device performs a training process so that the second learning model infers a change trend of a specific variable using the preprocessed execution logs and derives a maximum value and a minimum value of the variable (224). The researcher used a regression analysis technique as the second learning model. There are various regression-based learning techniques such as linear, ridge, logistic, and polynomial methods.

Figure 4:
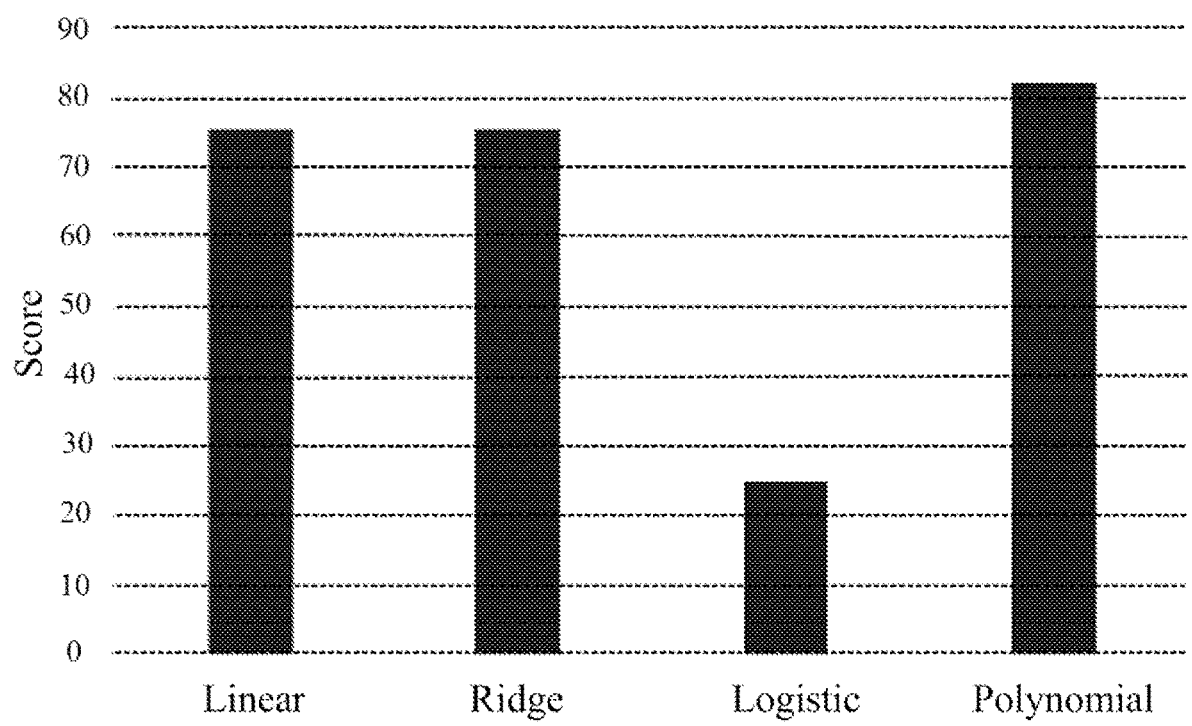
FIG. 4 is a graph illustrating performance evaluation results of a second learning model for inferring a maximum value and a minimum value of a variable.

The researcher constructed various regression analysis models and evaluated their performance. FIG. 4 is a graph illustrating performance evaluation results of the second learning model for inferring a maximum value and a minimum value of a variable. As shown in FIG. 4, polynomial regression analysis shows the highest performance. The researcher used polynomial regression analysis as the second learning model. The researcher constructed the second learning model by applying LinearRegression after converting data into scikit-learn's polynomialFeatures class.

Figure 5:
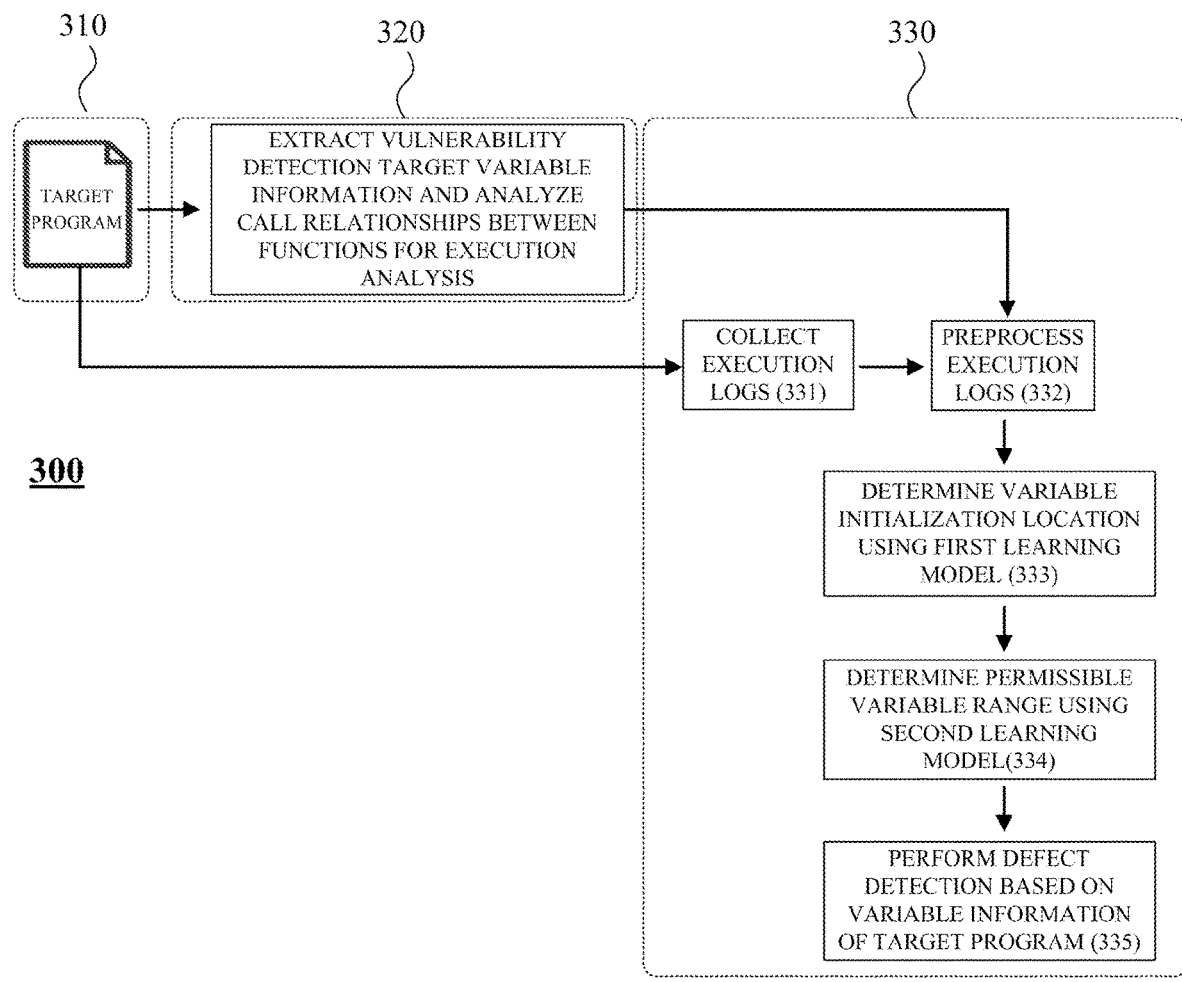
FIG. 5 is a diagram illustrating an inference process of detecting a variable vulnerability of software.

FIG. 5 is a diagram illustrating an inference process 300 of detecting a variable vulnerability of software.

An analysis device receives a source code of a target program to be analyzed (310).

The analysis device may remove codes irrelevant to analysis, such as annotations, blank lines, and the like, from the source code.

The analysis device may statically analyze the target program (320). The analysis device may extract a variable list by statically analyzing the source code of the target program. Also, for execution analysis, the analysis device may extract a list of functions that use variables and call relationships between the functions. Meanwhile, when the target program is identical to a program used in a learning process, static analysis results derived from the learning process may be used. In this case, the analysis device may not additionally perform static analysis. In other words, the analysis device may receive a variable list, a function list, and call relationships between functions together with the source code of the target program.

The analysis device performs dynamic verification using execution logs which are collected during execution of the program (330). The analysis device collects execution logs while executing the program (331). The analysis device accesses a variable to be monitored during execution of the program and extracts and collects a call function location, a variable name, variable values before and after access, and a call stack in an execution log. The analysis device pre-processes (generalizes) the collected execution logs into data that are usable for training (332). In the preprocessing process, the analysis device replaces call functions, variable names, and call stack functions in an initial execution log with function IDs and variable IDs.

The analysis device may analyze the preprocessed execution logs using a pretrained first learning model and determine whether the variable has been initialized at a correct location (333). The analysis device may determine whether a specific variable (global variable) has been initialized and/or an initialization location on the basis of a classification result of the first learning model.

The analysis device determines whether a value of the variable is within a range from a minimum value of the variable to a maximum value using a pretrained second learning model (334). The analysis device may determine whether the variable has been used, whether the variable value is within the permissible range, a change trend of variable values, and the like on the basis of an output result of the first learning model.

The analysis device analyzes whether the specific variable has a vulnerability on the basis of a variable initialization location, initialization information, information on use of the variable, information on changes in variable values, a permissible range of the variable, and the like. In this way, the analysis device performs defect detection on the target program (335). A detailed example of defect detection will be described below.

Figure 6:
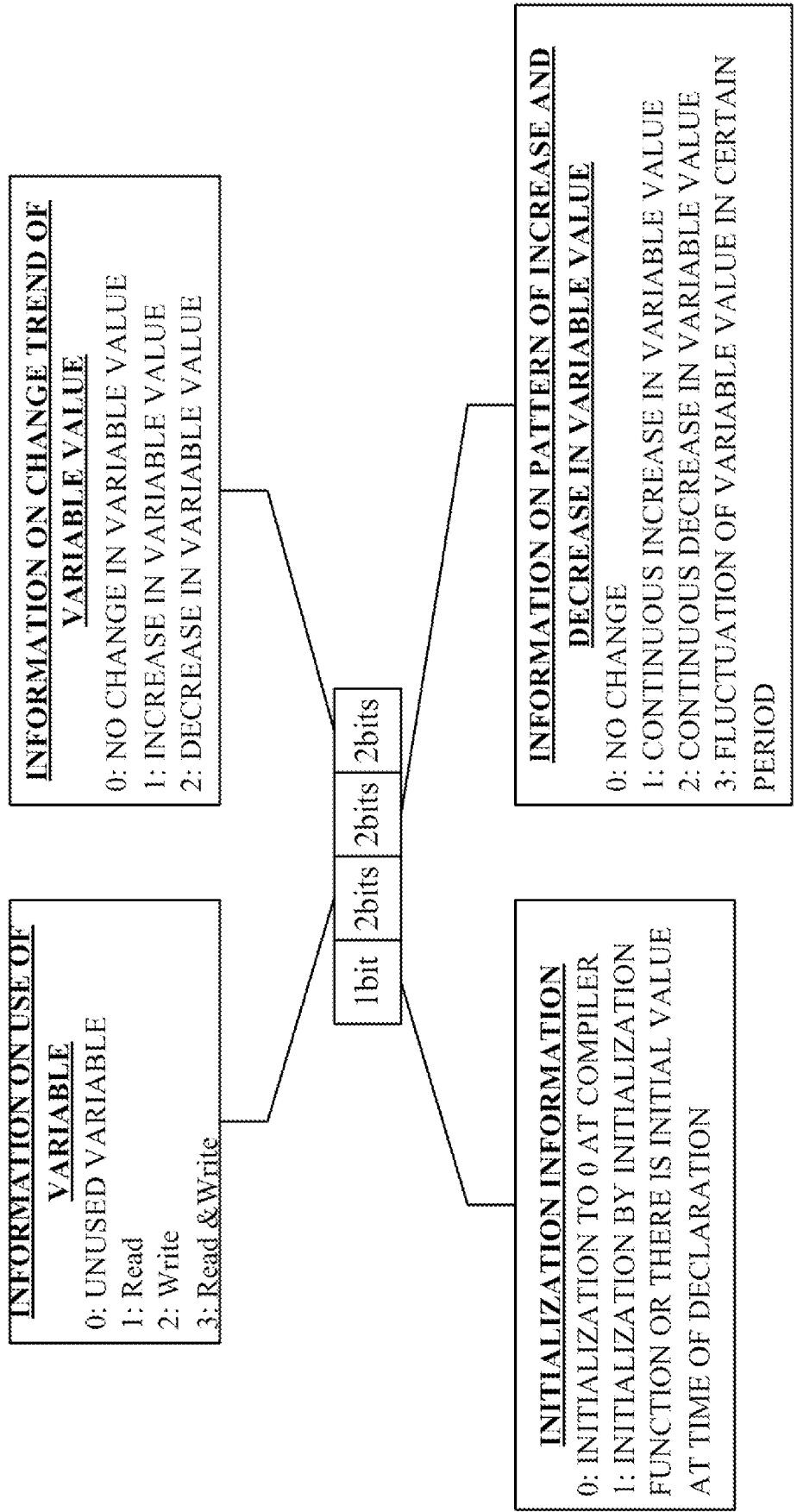
FIG. 6 is a diagram illustrating information on variables used when an analysis device analyzes a defect using an analysis model.

Through the above process, the analysis device analyzes the source code and the execution logs of the target program and derives information on variables. FIG. 6 is a diagram illustrating information on variables used when an analysis device analyzes a defect using an analysis model.

This is an example of information on variables derived using an analysis model. FIG. 6 shows an example of variable information corresponding to a plurality of flags. The variable information includes (i) initialization information, (ii) information on the use of variables, (iii) information on a change trend of variable values, and (iv) information on a pattern of increase and decrease in variable value. The initialization information may include whether a variable has been initialized by a compiler, whether a variable has been initialized by an initialization function, whether there is an initialization value when a variable is declared, and the like. The information on the use of variables may include whether a variable has been used, a purpose of using a variable being used (read, write, or read & write), and the like. The information on a change trend of variable values may include whether a variable has been changed, whether a variable has been increased or decreased, and the like. The information on a pattern of increase and decrease in variable value may include whether a pattern has been changed, a continuous increase in variable value, a continuous decrease in variable value, a fluctuation of a variable value in a certain period, and the like.

The analysis device detects variable vulnerabilities in the target program using results of analyzing the source code of the target program and the execution logs of the target program (335). The analysis device may continuously extract variable information from execution logs which are left by variables from the start to the end of execution of the target program and detect variable vulnerabilities on the basis of the variable information.

Figure 7:
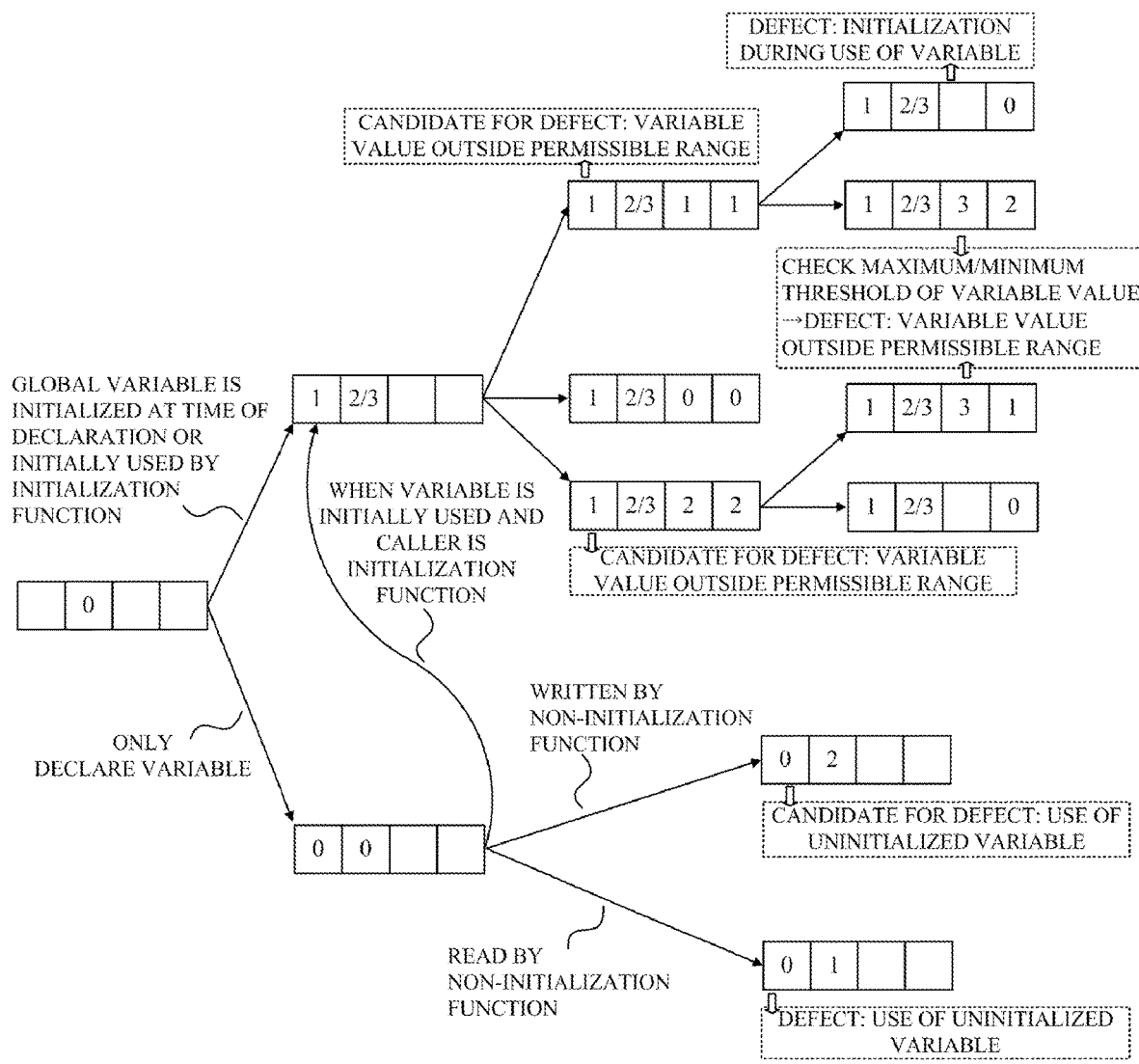
FIG. 7 is a diagram illustrating a process of determining a defect caused by a vulnerability using variable information of a target program.

FIG. 7 is a diagram illustrating a process of determining a defect caused by a vulnerability using variable information of a target program. A type of variable vulnerabilities determined by the analysis device is any one of (i) initialization during the use of a variable, (ii) a variable value outside a permissible range, and (iii) the use of an uninitialized variable.

When there is the initial value of a variable, the global variable is changed to the initial value during the use, and a called function is not an initialization function, the analysis device determines this case to be a defect of initialization during the use of the global variable.

During the extraction of a defect detection target, a global variable's name, data type, and initial value are extracted. When a variable value lies outside the maximum value or the minimum value of the extracted data type during the execution, the analysis device determines this case to be a defect of a value outside the permissible range of a variable. Also, when a value of the global variable continues to only increase or decrease and deviates from a maximum value or a minimum value of the variable derived by the second learning model, the analysis device determines this case to be a defect of a value outside the permissible range of a variable.

When information on an increase or decrease pattern of the variable value of a global variable is set to continuous increase or decrease even after the completion of all executions, the analysis device may determine that the variable is not initialized during the use. Since the value may deviate from the permissible range when the variable is used for a long time, the analysis device determines this case to be a candidate for a defect of a value outside the permissible range of a variable.

When the value of a variable is not initialized at the time of declaration and is used by a non-initialization function, the analysis device may determine this case to be a defect of use of an uninitialized variable. When the value of a variable is read at a location where the variable is used for the first time, the analysis device determines this case to be a defect of use of an uninitialized variable. When a function writes a value to a variable, the function may be learned as an initialization function. Accordingly, the analysis device determines this case to be a candidate for a defect of use of an uninitialized variable.

The researcher constructed the above analysis model using the C language and Python. The researcher verified the constructed analysis model and its vulnerability detection performance.

Applications used in the verification experiment are shown in Table 2 below. The researcher experimented on seven well-known Linux applications. Execution logs used for training were collected by running sample scripts of the Linux manual page, test cases provided by Software Assurance Reference Dataset (SARD), and test cases of the Linux Test Project (LTP) for each application.

TABLE 2

| Application | | | |
| --- | --- | --- | --- |
| Name | Description | Size (LOC) | Test case for collecting execution logs used for training |
| grep | Search utility | 5317 | Linux manual-sample scripts, SARD |

TABLE 2-continued

| Application | | | |
|---|---|---|---|
| Name | Description | Size (LOC) | Test case for collecting execution logs used for training |
| gzip | Compression program | 7592 | Linux manual-sample scripts, LTP |
| bc | Shell calculator | 8803 | Linux manual-sample scripts |
| wc | Word counter | 1126 | Linux manual-sample scripts, LTP |
| sort | Sorter | 4850 | Linux manual-sample scripts, |
| sed | Script editor | 5234 | Linux manual-sample scripts |
| jpegtran | jpeg transformation | 31,839 | Linux manual-sample scripts |

The researcher artificially introduced defects into the applications to detect vulnerabilities caused by variables. The researcher utilized data used in related research Clang software-based fault isolation (SFI) (Gabor et al., "High-Accuracy Software Fault Injection in Source Code with Clang" 2019 IEEE 24$^{th}$ Pacific Rim International Symposium on Dependable Computing (PRDC), pp. 75-7509). Defect types corresponding to variable vulnerabilities related to the method proposed by the researcher among the defects injectable using Clang-SFI are shown in Table 3 below.

TABLE 3

| | | Injection example | |
|---|---|---|---|
| Defect type | Description | Before defect injection | After defect injection |
| MAVAE | Missing variable assignment using an expression | hash ^ = s → elems[i]. index + s → elems[i]. constraint; | — |
| MVAV | Missing variable assignment using a value | options = 0 | — |
| MVIV | Missing variable initialization using a value | int options = 0; | int options; |
| WVAV_1 | Wrong value assigned to variable | state_newline = 0 | state_newline = 1894; (value returned from Clang-SFI) |
| WVAV_2 | | | state_newline = INT_MIN state_newline = INT_MAX |
| WVAV_3 | | | state_newline = rand( ) |

The researcher extracted local variables and global variables from the applications of Table 2 and injected the defect types of Table 3 at each extracted location. In the case of the "wrong value assigned to variable" (WVAV) defect type, according to Clang-SFI, the value is toggled when the value is of the Boolean type. Otherwise, a value of "0xFF" is injected as a wrong value. However, for the verification of more diverse cases, the researcher defined that a type of defect injected according to Clang-SFI is WVAV_1, the case of injecting maximum and minimum values for a type of corresponding variable is WVAV_2, and the case of injecting a value selected randomly from values that a corresponding variable may have is WVAV_3.

The researcher compared performance of the proposed technique for detecting a variable vulnerability on the basis of an analysis model (proposed technique) with performance of related analysis tools. The related analysis tools used for comparison are shown in Table 4 below.

TABLE 4

| Category | Tool name | Detectable defect type | Application of AI/ML |
|---|---|---|---|
| Static Code similarity | VUDDY | CWE vulnerability | X |
| | SySeVR | CWE vulnerability | O |
| Pattern-based | CppCheck | Use of uninitialized variable, type conversion error, out-of-bound access to array, and the like | X |
| | ControlFlag | CWE vulnerability | O |

The researcher particularly compared performance of detecting variable vulnerabilities. The researcher experimented on VUDDY, SySeVR, CppCheck, and ControlFlag which are tools employing a technique for detecting vulnerabilities by comparing code similarity and a technique for detecting vulnerabilities on the basis of a pattern, and compared the results. VUDDY and CppCheck are tools to which AI or ML is not applied, whereas SeSeVR and ControlFlag are AI/ML-based tools. Performance experiment results are shown in Table 5 below.

TABLE 5

| Category | Analysis tool | False positive rate | Accuracy | Precision | Variable vulnerability detection rate |
|---|---|---|---|---|---|
| Code similarity comparison | VUDDY | 0 | 9.17 | 100 | 9.17 |
| | SySeVR | 22.9 | 18.5 | 77.08 | 18.5 |
| Pattern-based | CppCheck | 36.84 | 77.92 | 63.16 | 15.58 |
| | ControlFlag | 0 | 9.5 | 100 | 9.5 |

TABLE 5-continued

| Category | Analysis tool | False positive rate | Accuracy | Precision | Variable vulnerability detection rate |
|---|---|---|---|---|---|
| Other | Proposed technique | 0 | 77.55 | 100 | 77.55 |

The researcher evaluated a false positive rate, accuracy, precision, and a variable vulnerability detection rate for each defect type. The proposed technique showed a false positive rate of 0%, an accuracy of 77.55%, a precision of 100%, and a variable vulnerability detection rate of 77.55%. Other tools showed variable vulnerability detection rates of 6% to 18.5%, lower than that of the proposed technique.

Figure 8:
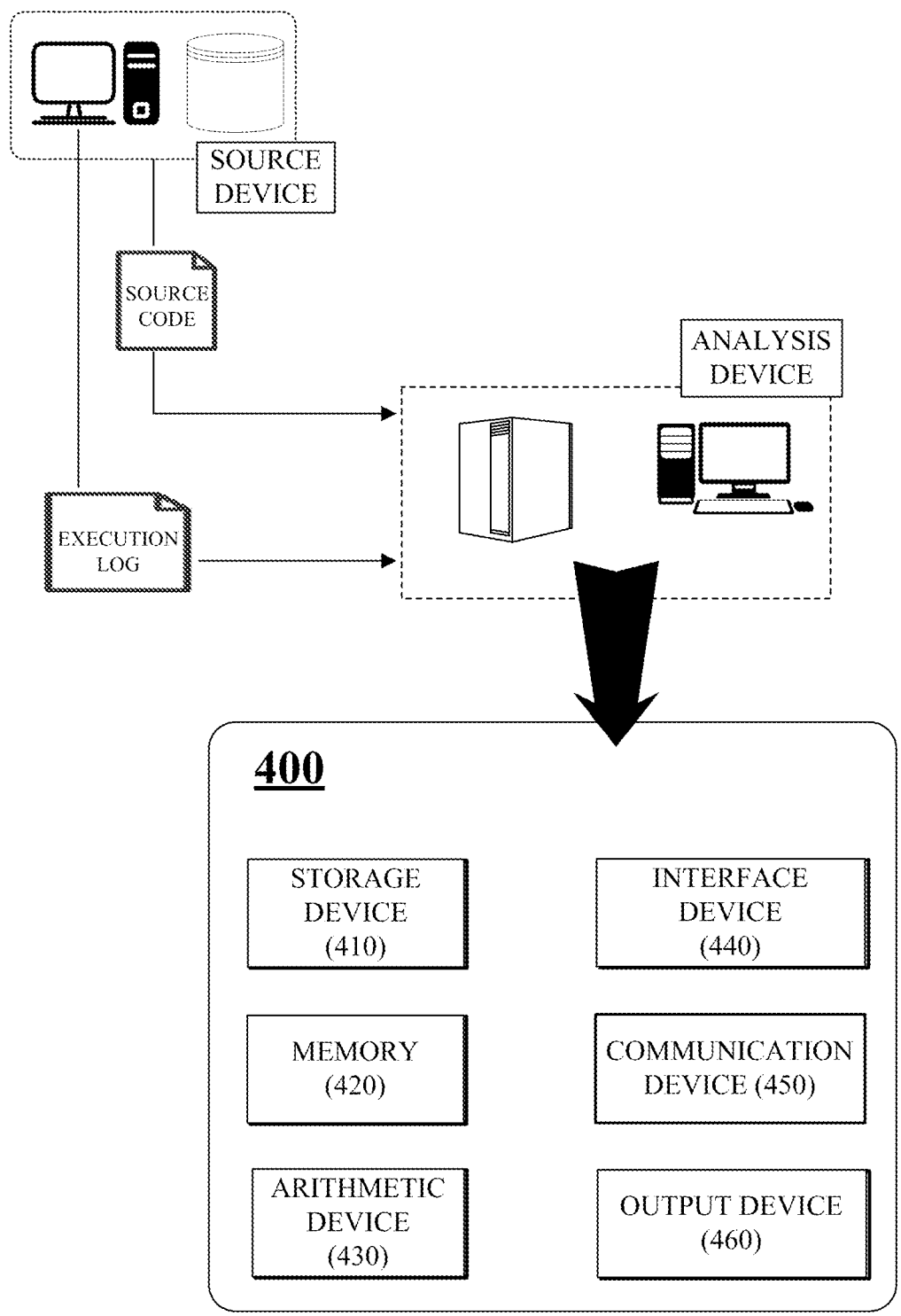
FIG. 8 is a diagram illustrating an analysis device for detecting a variable vulnerability of software.

FIG. 8 is a diagram illustrating an analysis device 400 for detecting a variable vulnerability of software. The analysis device 400 corresponds to the analysis device 130 or 150 of FIG. 1. The analysis device 400 detects variable defects in software using the above analysis model. The analysis device 400 may be physically implemented in various forms. For example, the analysis device 400 may be a PC, a smart device, a server in a network, a chipset dedicated to data processing, or the like.

The analysis device 400 may include a storage device 410, a memory 420, a arithmetic device 430, an interface device 440, a communication device 450, and an output device 460.

The storage device 410 may store the above analysis model. The analysis model includes a first learning model for determining a variable initialization location and a second learning model for estimating a variable value (maximum and minimum values) in an execution process. As described above, the first learning model may classify whether a function using variables is a function that initializes variable values (initialization function). The second learning model may output maximum and minimum values of a global variable.

The storage device 410 may store a program or code for statically analyzing a source code of a target program to be analyzed.

The storage device 410 may store a program or code for generating execution logs of the source code.

The storage device 410 may store a program or code for uniformly preprocessing execution logs.

The storage device 410 may store a program or code for determining variable defects or defect candidates on the basis of output information (initialization locations, variable value information, and the like) of the analysis model. This has been described with reference to FIG. 7.

The storage device 410 may store the source code of the target program.

The storage device 410 may store the execution logs of the target program.

The memory 420 may store data, information, and the like generated in the process in which the analysis device 400 detects variable vulnerabilities in the target program.

The interface device 440 is a device for externally receiving certain commands and data.

The interface device 440 may receive the source code of the target program from a physically connected input device or external storage device.

The interface device 440 may receive the source code from a source device. The source device may be a computing device for executing the source code or an additional storage device for storing the source code to be analyzed.

The interface device 440 may also receive the execution logs of the target program. The interface device 440 may receive the execution logs from the source device. The interface device 440 may receive the execution logs from the source device executing the source code.

The communication device 450 is an element for receiving and transmitting certain information through a wired or wireless network.

The communication device 450 may receive the source code of the target program from an external object. The communication device 450 may receive the source code from the source device.

The communication device 450 may receive the execution logs of the target program.

The communication device 450 may receive the execution logs from the source device. The communication device 450 may receive the execution logs from the source device executing the source code.

The communication device 450 may transmit variable vulnerability detection results of the target program to an external object.

Further, the interface device 440 may be an element for receiving data received by the communication device 450

The output device 460 is a device for outputting certain information. The output device may output an interface required for a data processing process, analysis results, and the like. The output device 460 may output a defect detection result.

The arithmetic device 430 may statically analyze the source code of the target program. In this way, the arithmetic device 430 may extract a list of variables which are vulnerability detection targets, a function list, and call relationships between the functions.

The arithmetic device 430 may extract the execution logs while executing the source code of the target program.

The arithmetic device 430 accesses variables to be monitored during the execution of the target program and extracts and collects call function locations, variable names, variable values before and after access, and a call stack in the execution logs.

The arithmetic device 430 may preprocess the collected execution logs into data that is usable for training. The preprocessing is a process of replacing call functions, variable names, and call stack functions in an execution log with function IDs and variable IDs. The preprocessing in the defect detection process is performed in the same way as preprocessing in the training process.

The arithmetic device 430 analyzes the preprocessed execution logs using the first learning model. The arithmetic device 430 may determine variable initialization locations through the first learning model. The first learning model may output whether a specific variable has been initialized or an initialization location of the specific variable. The first learning model may receive the preprocessed execution logs and classifies whether each {global variable-call function} pair is an initialization function.

The arithmetic device 430 analyzes the preprocessed execution logs using the second learning model. The arithmetic device 430 may extract maximum and minimum values of a specific variable from the execution process through the second learning model. The arithmetic device 430 may determine whether variables have been used or change trends of variable values on the basis of information output by the second learning model.

Information extracted through the first learning model and the second learning model is variable information extracted from the execution logs. The variable information extracted from the execution logs may include (i) initialization information, (ii) information on the use of variables, (iii) information on a change trend of variable values, and (iv) information on a pattern of increase and decrease in variable value.

The arithmetic device 430 may determine variable vulnerabilities on the basis of the variable information extracted from the execution logs. The determination process has been described above with reference to FIG. 7.

The arithmetic device 430 may determine a vulnerability of a global variable to be any one of (i) initialization during the use of a variable, (ii) a variable value outside a permissible range, and (iii) the use of an uninitialized variable.

The arithmetic device 430 may be a processor, an application processor (AP), or a program-embedded chip which processes data and certain calculations.

The above method of detecting vulnerabilities or defects of program variables may be implemented as a program (or application) including a computer-executable algorithm. The program may be stored and provided in a transitory or non-transitory computer-readable medium.

The non-transitory computer-readable medium is not a medium that stores data for a short time, such as a register, a cache, a memory, or the like, but a medium that stores data semi-permanently and is readable by a device. Specifically, the above various applications or programs may be stored and provided in a non-transitory computer-readable medium such as a CD, a DVD, a hard disk, a Blu-ray disc, a Universal Serial Bus (USB) memory, a memory card, a read-only memory (ROM), a programmable read-only memory (PROM), an erasable PROM (EPROM), electrically EPROM (EEPROM), a flash memory, or the like.

The transitory computer-readable medium is one of various random-access memories (RAMs) such as a static RAM (SRAM), a dynamic RAM (DRAM), a synchronous DRAM (SDRAM), a double data rate (DDR) SDRAM, an enhanced SDRAM (ESDRAM), a SyncLink DRAM (SLDRAM), and a direct Rambus RAM (DRRAM).

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A computer-implemented method executed by an analysis device storing a pretrained first learning model and a pretrained second learning model for detecting a variable vulnerability in software, the method comprising:
   receiving, by the analysis device, a source code of a program to be analyzed;
   executing the program to generate an execution log;
   preprocessing, by the analysis device, the execution log by replacing call functions, variable names, and call stack functions with identifiers;
   classifying, by the analysis device, for each pair of a global variable and a call function whether each pair of a global variable and a call function is at an initialization location in the preprocessed execution log through the pretrained first learning model;
   estimating, by the analysis device, a maximum value and a minimum value of the global variable in the preprocessed execution log through the pretrained second learning model; and
   outputting, by the analysis device, a detection result indicating whether the global variable is vulnerable on a basis of (i) whether the global variable has been initialized or an initialization location of the global variable determined according to a classification result of the pretrained first learning model and (ii) information output by the pretrained second learning model.

2. The method of claim 1, wherein the analysis device determines whether the global variable has been used or a change trend of variable values on a basis of the information output by the pretrained second learning model, and
   determines whether the global variable is vulnerable using one or more of whether the global variable has been initialized, the initialization location of the global variable, and the change trend of variable values.

3. The method of claim 1, wherein the analysis device determines a type of vulnerability of the global variable selected from the group consisting of (i) initialization during use of a variable, (ii) a variable value outside a permissible range, and (iii) use of an uninitialized variable.

4. The method of claim 1, further comprising statically analyzing, by the analysis device, the source code before preprocessing of the execution log to extract initial values of variables, a list of functions, and call relationships between the functions.

5. The method of claim 1, if an initial value of the global variable is changed during the execution of the program, and a function which changes the initial value is not an initialization function, the analysis device determines the global variable to be a defect of initialization during use of the global variable.

6. The method of claim 1, wherein, when a variable value of the global variable deviates from a maximum value or a minimum value of a data type of the global variable during the execution, the analysis device determines the global variable to be a defect.

7. The method of claim 1, wherein, when the global variable is used by a function other than an initialization function without being initialized, the analysis device determines the global variable to be a defect.

8. An analysis device for detecting a variable vulnerability in software, the analysis device comprising:
   an interface configured to receive a source code of a program to be analyzed;
   a storage configured to store a pretrained first learning model for classifying an initialization location of a global variable and a pretrained second learning model for estimating a maximum value and a minimum value of the global variable; and a processor configured to:

execute the program to generate an execution log;

preprocess the execution log by replacing call functions, variable names, and call stack functions with respective identifiers (IDs);

input the preprocessed execution log to the pretrained first learning model to classify, for each pair of a global variable and a function call, whether the global variable has been initialized;

input the preprocessed execution log to the pretrained second learning model to estimate, for each global variable, a maximum value and a minimum value; and determine whether a global variable is vulnerable based on (i) whether the global variable has been initialized or an initialization location, and (ii) a classification result of the pretrained first learning model.

9. The analysis device of claim 8, wherein the processor is configured to determine whether the global variable has been used or a change trend of variable values on a basis of information output by the pretrained second learning model, and determine whether the global variable is vulnerable using at least one of whether the global variable has been initialized, the initialization location of the global variable, and the change trend of variable values.

10. The analysis device of claim 8, wherein the processor is configured to determine a type of vulnerability of the global variable selected from the group consisting of (i) initialization during use of a variable, (ii) a variable value outside a permissible range, and (iii) use of an uninitialized variable.

* * * * *